US012585219B2

(12) United States Patent
Itoh

(10) Patent No.: US 12,585,219 B2
(45) Date of Patent: Mar. 24, 2026

(54) IMAGE FORMING APPARATUS WITH PROCESSING UNIT TO CONTROL COOLING FAN OPERATION

(71) Applicant: CANON KABUSHIKI KAISHA, Tokyo (JP)

(72) Inventor: Masatoshi Itoh, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/757,755

(22) Filed: Jun. 28, 2024

(65) Prior Publication Data

US 2025/0004408 A1    Jan. 2, 2025

(30) Foreign Application Priority Data

Jun. 29, 2023    (JP) .................................. 2023-107145

(51) Int. Cl.
| | |
|---|---|
| *G03G 15/16* | (2006.01) |
| *G03G 15/00* | (2006.01) |
| *H02M 1/32* | (2007.01) |
| *H02M 3/335* | (2006.01) |

(52) U.S. Cl.
CPC ......... *G03G 15/5004* (2013.01); *G03G 15/80* (2013.01); *H02M 1/32* (2013.01); *H02M 3/33523* (2013.01)

(58) Field of Classification Search
USPC ......................................................... 399/37
See application file for complete search history.

(56) References Cited

U.S. PATENT DOCUMENTS

| | | | |
|---|---|---|---|
| 9,823,617 B2 | 11/2017 | Shimura et al. | |
| 10,069,435 B2 | 9/2018 | Itoh | |
| 10,303,091 B2 | 5/2019 | Isomi et al. | |
| 11,567,441 B2 | 1/2023 | Itoh | |
| 2008/0224540 A1* | 9/2008 | Sugawara | .......... G03G 15/2039 |
| | | | 307/46 |
| 2020/0112264 A1 | 4/2020 | Arima et al. | |
| 2021/0063923 A1* | 3/2021 | Odate | ................ G03G 15/5004 |
| 2022/0404752 A1* | 12/2022 | Yoshimura | ......... G03G 15/5004 |

FOREIGN PATENT DOCUMENTS

| | | |
|---|---|---|
| JP | 2007-079178 A | 3/2007 |
| JP | 2017-091085 A | 5/2017 |
| JP | 2020-058166 A | 4/2020 |
| JP | 2020-156123 A | 9/2020 |

* cited by examiner

*Primary Examiner* — Quana Grainger
(74) *Attorney, Agent, or Firm* — Venable LLP

(57) ABSTRACT

An image forming apparatus operable in a first mode operated in a first voltage and in second mode operated in a second voltage lower than the first voltage. The apparatus includes a power source device, cooling fan, temperature detector, controller and a recovery circuit. The recovery circuit outputs a signal when a detected temperature of the temperature detector is equal to a predetermined temperature or higher. The controller includes a port for detecting the signal outputted from the recovery circuit in the second mode. Upon detecting that the signal is inputted to the port from the recovery circuit in the second mode, the controller switches the power source device to in a first output mode for outputting the first voltage from in a second output mode for outputting the second voltage and operates the cooling fan to cool the power source device.

11 Claims, 7 Drawing Sheets

| | PRINT | STANDBY | SLEEP | PWR OFF |
|---|---|---|---|---|
| PWR MODE (DC Vo2) | 24V | 24V | 10V | 10V |
| CPU MODE | FULL | FULL | LOW PWR | LOWER PWR THAN SLEEP |
| IO PORT A | ○ | ○ | △ INTRMTTNT | ✕ |
| IO PORT B | ○ | ○ | ✕ | ✕ |
| AD CONVERTER | ○ | ○ | ✕ | ✕ |
| EXT TRGGR PORT | ○ | ○ | ○ | ○ |

⇧ PERIODICALLY MONITOR DURING SLEEP

⇧ STOP DURING SLEEP, PWR OFF

⇧ ALWAYS DETECTABLE { RECOVERY CRCT 127 PWR SWTCH, ETC

Fig. 4

IMAGE FORMING APPARATUS WITH PROCESSING UNIT TO CONTROL COOLING FAN OPERATION

FIELD OF THE INVENTION AND RELATED ART

The present invention relates to an image forming apparatus and relates to a configuration, for example, in which the image forming apparatus such as a copier, a fax machine, a printer, etc. is provided with a power source device and the power source device is protected from an overload/overcurrent condition.

The image forming apparatus such as a copier, a fax machine, a printer, etc. which forms an image on a recording material by using an electrophotographic process, etc., is provided with a power source device which generates DC voltage from AC voltage and supplies electric power which is necessary for conveying the recording material and image forming. In most cases, a power source device outputs at least two DC voltages, one of which is a low voltage output (for example, from 3.3V to 5.0V) which is necessary for a control element and a control circuit such as CPU/ASIC. The other is a high voltage output (for example, approximately 24V) which supplies to actuators such as motor/solenoid, etc. As a configuration of a power source device, some of them are provided with a plurality of AC-DC converters, while some of them are provided with only one system of an AC-DC converter which outputs a high voltage (for example, approximately 24V). And some of them generates a low voltage (for example, from 3.3V to 5.0V) which is necessary for a control circuit with a DC-DC converter from a high voltage (for example, approximately 24V), etc.

These power source devices are conventionally provided with a protection circuit, which protects the power source devices from failure by stopping operation of the power source devices, etc. in a case that an output is an overcurrent condition. Inside a device in which the power source device supplies electric power, in a case that a larger-than-expected amount of power is consumed or a case that a short circuit failure, etc. is occurred on a power source path, the power source device is in an overcurrent condition. Then, the power source device detects the overcurrent condition and stops the output in order to avoid occurrence of failure, etc. For example, in Japanese Laid-Open Patent Application (JP-A) 2020-058166, a power source device, which is provided with a protection function which stops a switching control of a primary side control circuit in a case that an abnormality such as excessive current flow to an output due to a load short circuit, etc. is occurred, is proposed. Further, for example, such as Japanese Laid-Open Patent Application (JP-A) 2020-156213, in order to realize further space saving and lower cost, a device, in which an overcurrent detection means is only provided on a primary side while the overcurrent detection means is not provided on a secondary side, is proposed.

Furthermore, in a recent power source device in which lower cost is in high demand, a configuration, in which an AC-DC converter which is more costly is limited to only one system, is widely used. Such a power source device, in a power off mode and a sleep mode, changes voltage of an AC-DC converter from high voltage (approximately 24V) to medium voltage (approximately from 6V to 12V), and generates low voltage (from 3.3V to 5.0V) which is necessary for a control circuit by a DC-DC converter. In this way, such a power source device realizes energy saving.

However, in the configuration in which the AC-DC converter is limited to only one system, following issues are existed in a condition that the output of the AC-DC converter is reduced to a medium voltage (from 6V to 12V) in the power source off mode and the sleep mode. That is, in a case that a load current becomes excessive in a condition that medium voltage is being generated, since it is not possible to protect by an overcurrent protection circuit on a primary side, it is necessary to provide an overcurrent protection circuit on a secondary side as well and this may lead to an increase in cost and an increase in space.

An object of the present invention is to protect a device in a condition of a power off mode and a sleep mode without increasing cost or space, even in a case of a power source device which is provided with one system of AC-DC converter.

SUMMARY OF THE INVENTION

In response to the above issue, the present invention is provided with a configuration as below.

An image forming apparatus operable in a first mode and in a second mode comprising: a power source device configured to convert an AC voltage of a primary side to a DC voltage and supply to a load of a secondary side, the power source device being operable in a first output mode for outputting a first voltage which is a DC voltage and in a second output mode for outputting a second voltage lower than the first voltage, and in the first outputting mode of the power source device the image forming apparatus operating in the first mode and in the second outputting mode the image forming apparatus operating in the second mode; a cooling means configured to cool the power source device; a temperature detecting means disposed in the secondary side of the power source device and configured to detect a temperature of the power source device; a control means configured to control the cooling means based on a detecting result of the temperature detecting means, the control means being capable of switching the power source device between in the first output mode and in the second output mode; and a signal output circuit configured to output a signal to the control means when the temperature detected by the temperature detecting means is equal to a predetermined temperature or higher, wherein the control means includes a port capable of detecting the signal outputted from the signal output circuit in the second mode, wherein the cooling means operable in the first voltage, and wherein upon detecting that the signal is inputted to the port from the signal output circuit in the second mode the control means controls to switch the power source device from in the second output mode to in the first output mode and controls to operate the cooling means to cool the power source device.

Further features of the present invention will become apparent from the following description of exemplary embodiments with reference to the attached drawings.

BRIEF DESCRIPTION OF THE DRAWINGS

FIG. 4 is a table showing a condition of a power source unit and a CPU according to the first embodiment.

DESCRIPTION OF THE EMBODIMENTS

First Embodiment

[Image Forming Apparatus]

Figure 1:
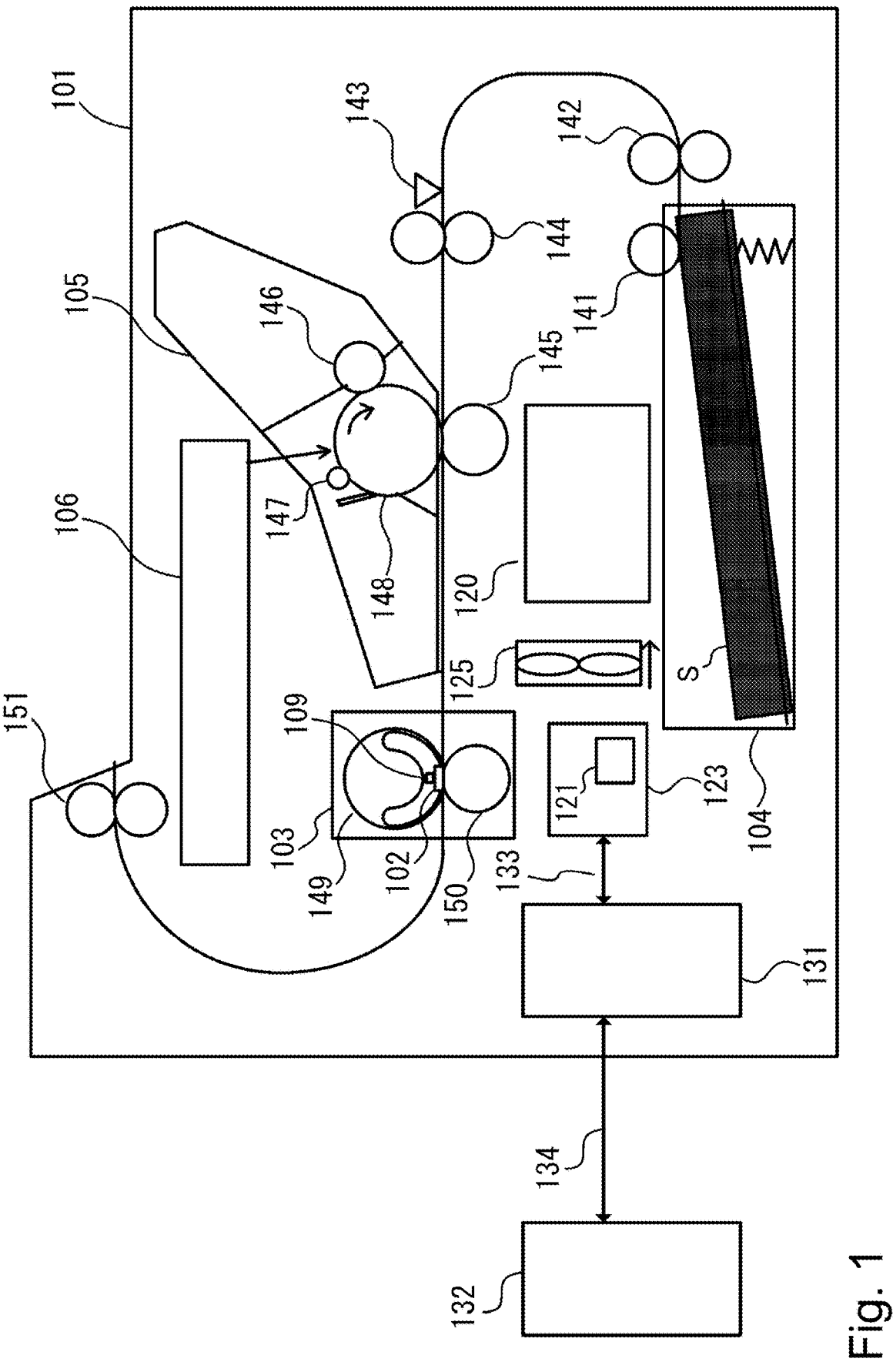
FIG. 1 is a view showing a configuration of an image forming apparatus according to a first embodiment of the present invention.

In the following, an embodiment of the present invention in an image forming apparatus will be described with reference to figures. FIG. 1 is a sectional view showing a schematic configuration of an image forming apparatus using an electrophotographic process. Incidentally, the first embodiment will be described in a case of a laser beam printer as an example of an image forming apparatus, however, it may be an image forming apparatuses of a copier, a fax machine or a multifunction printer of these, etc.

A main assembly 101 of a laser beam printer which is shown in FIG. 1 (hereinafter, referred to as a main assembly 101) includes a sheet feeding cassette 104, a sheet feeding roller 141, a conveying roller pair 142, a top sensor 143 and a registration roller pair 144. The sheet feeding cassette 104 accommodates a recording material S which is a recording medium. The sheet feeding roller 141 pulls out the recording material S from the sheet feeding cassette 104. The top sensor 143 is arranged downstream of the conveying roller pair 142 and detects a leading end of the recording material S. The registration roller pair 144 conveys the recording material S synchronously based on a detection result of the top sensor 143.

The main assembly 101 includes a cartridge unit 105 which forms a toner image on the recording material S based on a laser light from a laser scanner 106 downstream of the registration roller pair 144. The cartridge unit 105 includes a photosensitive drum 148 as an image bearing member, a charging roller 147, a developing roller 146, etc. which are necessary for a known electrophotographic process, and forms a toner image on the recording material S with a transfer roller 145. The main assembly 101 includes a fixing unit 103 downstream of the cartridge unit 105 for thermally fixing an unfixed toner image which is formed on the recording material S. The fixing unit 103 includes a fixing film 149, a pressing roller 150, a heater 102 which is arranged inside the fixing film 149 and a thermistor 109 which is arranged near the heater 102 in order to detect the temperature of the heater 102 inside the fixing film 149 as well. The main assembly 101 includes a discharging roller pair 151 downstream of the fixing unit 103 and discharges the recording material S which is thermally fixed after forming the toner image.

The main assembly 101 is provided with a power source unit 120, which is a power source device which will be described below. The power source unit 120 converts an AC voltage of a primary side to a DC voltage and supplies to a load of a secondary side. The power source unit 120 is able to output a voltage of 24V which is a first voltage, or a voltage of 10V which is a second voltage which is lower than the first voltage, while switching as appropriate, and the main assembly 101 generates a voltage of 24 V in a print mode or a standby mode. Incidentally, the print mode is a mode in which the main assembly 101 is performing printing (image forming operation) or is in a condition that it is possible to print immediately, and the standby mode is a mode in which the main assembly 101 is possible to switch to the print mode upon receiving a print command.

The power source unit 120 supplies a voltage of 24V to a driving unit (not shown), a high voltage power source (not shown), a driving portion of a rotational polygon mirror (not shown), etc. as a driving system voltage via an engine controller 123 which will be described below. Here, the driving unit includes a motor, a clutch, etc. (not shown). The high voltage power source supplies a high voltage to the cartridge unit 105. The laser scanner 106 includes a rotational polygon mirror (not shown), and the driving portion drives the rotational polygon mirror.

The main assembly 101 includes a cooling fan 125. The cooling fan 125 which is a cooling means is a fan for cooling the power source unit 120 and cools the power source unit 120 by blowing air (wind) against the power source unit 120. Incidentally, a direction of the air is indicated by an arrow in FIG. 1. The cooling fan 125 is able to blow the air only when the voltage of 24 V is output from the power source unit 120.

The main assembly 101 includes an engine controller 123. The engine controller 123 controls the main assembly 101. The engine controller 123 controls a conveying of the recording material S while operating each roller by controlling the driving unit which is described above. Further, the engine controller 123 controls the laser scanner 106, the cartridge unit 105, the fixing unit 103, etc. and performs the operation of image forming (hereinafter, referred to as printing). Further, a DC-DC converter 121 which will be described below, is mounted in the engine controller 123 and generates a voltage of 3.3V which is mainly used in a control system based on a voltage which is supplied from the power source unit 120. And the voltage of 3.3V is supplied to a circuit of a control system which includes a control circuit inside the engine controller 123 (not shown), a video controller 131 which will be described below, a laser emitting portion of the laser scanner 106 (not shown), the top sensor 143, etc.

The main assembly 101 includes the video controller 131. The video controller 131 is connected to the engine controller 123 by an interface 133. Further, the video controller 131 is also connected to an external device 132 such as a personal computer by a general purpose external interface 134 (for example, USB (Universal Serial Bus), etc.).

The power source unit 120 detects a zero-cross timing of an AC power source 200 (see FIG. 2) which will described below, and sends a zero-cross detection signal (not shown) to the engine controller 123. The zero-crossing timing is a timing when a waveform of the AC voltage changes from positive to negative or from negative to positive. The engine controller 123 appropriately controls a switching means (not shown) of the heater 102 so that the electric power from the AC power source 200 is synchronized with the zero-cross timing to become a predetermined phase angle or duty ratio of a predetermined wave number. In this way, the engine controller 123 controls the heater 102 to become a predetermined temperature.

The video controller 131 receives print information (including the number of sheets and various types of settings, etc., for example) and data for printing from the external interface 134. The video controller 131 includes an image control portion (not shown) inside, and develops the data for printing into image data which is possible to be actually printed. After that, the engine controller 123 receives the image data which is developed from the video controller 131 via the interface 133 at a predetermined timing and sends it to the laser scanner 106. Incidentally, the image forming apparatus to which the power source device of the present invention is applicable is not limited to the configuration which is described in FIG. 1, however, it is also applicable to a color image forming apparatus, for example.

[Power Source Unit and Engine Controller].

Figure 2:
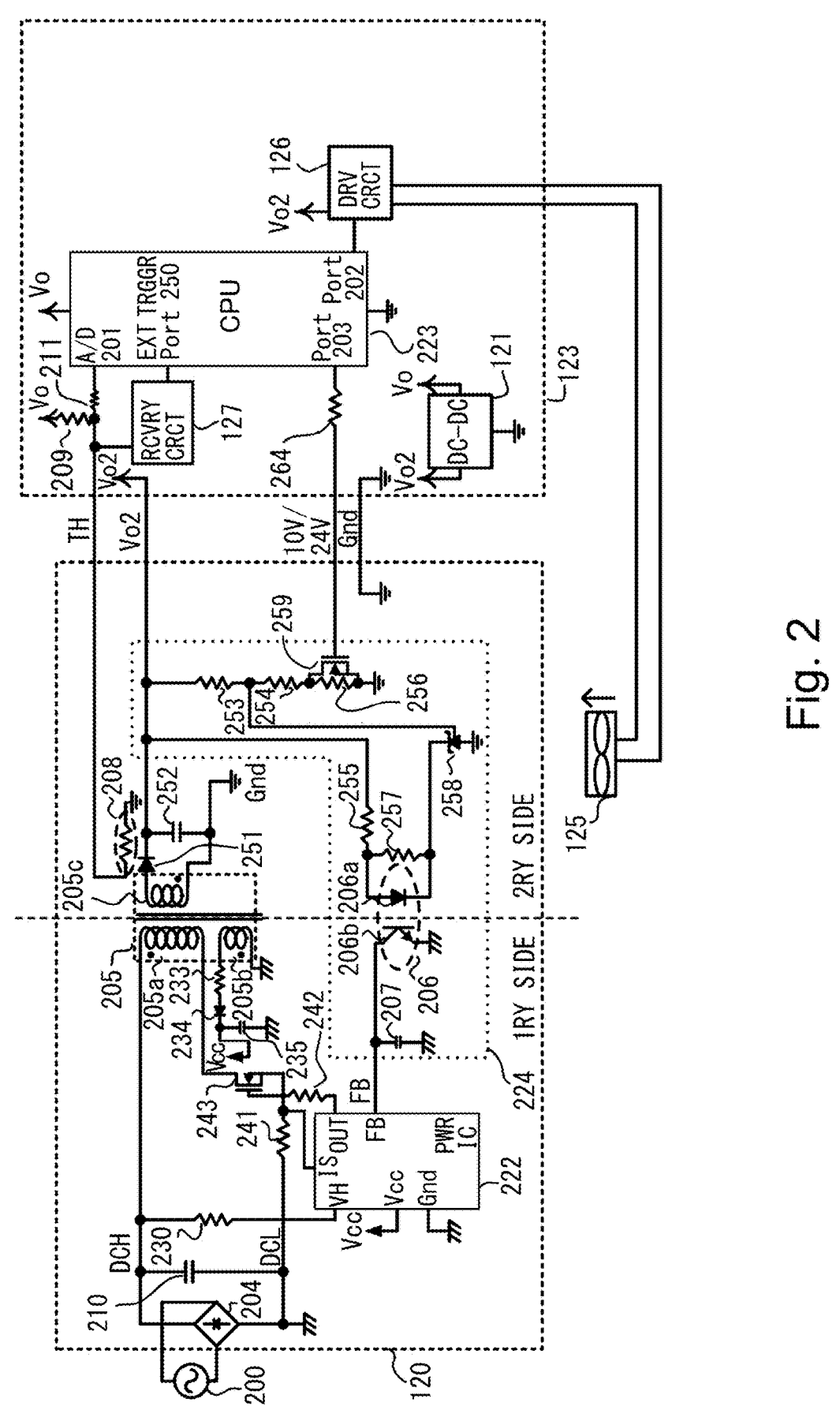
FIG. 2 is a diagram showing a configuration of a power source unit and an engine controller according to the first embodiment.

FIG. 2 is a diagram showing a configuration of the power source unit 120 and the engine controller 123 according to the first embodiment. In FIG. 2, a left side of a dashed line is the primary side and a right side of a dashed line is the secondary side. The AC power source 200 is connected to the power source unit 120, and a DC voltage Vo2 (which is also an output voltage) is generated from the input AC voltage and is output to the secondary side. Here, the power source unit 120 is able to output two DC voltages which are 24V and 10V as the DC voltage Vo2.

Specifically, when the main assembly 101 is in the print mode or the standby mode (standby state ready for immediate printing), the power source unit 120 outputs 24 V as the DC voltage Vo2. On the other hand, when the main assembly 101 is in a sleep mode (a power saving mode) in which power consumption is reduced or in a power off mode, the power source unit 120 outputs 10V as the DC voltage Vo2. Incidentally, even in the power off mode, the AC voltage is still input to the power source unit 120. A condition in which the power source unit 120 is outputting the DC voltage Vo2 of 24V is defined as a first output mode, and a condition in which the power source unit 120 is outputting the DC voltage Vo2 of 10V is defined as a second output mode. The first output mode and the second output mode are collectively referred to as a power source mode. And switching of the DC voltage Vo2 is performed by a CPU 223 which is a control means which is mounted in the engine controller 123. That is, the CPU 223 is able to switch between the first output mode and the second output mode. The main assembly 101 is able to operate while switching between the first mode (the print mode and the standby mode) which operates in the first output mode, and the second mode (the sleep mode and the power off mode) which operates in the second output mode.

The AC voltage which is input to the power source unit 120 is rectified by a bridge diode 204 and, after that, is smoothed by a capacitor 210 and becomes a DC voltage in which a DCL line is negative and a DCH line is positive. And the DCH line is connected to one of two terminals of a primary winding 205a of a transformer 205 and is also connected to a VH terminal of a power source IC 222 via a resistor 230, and voltage is supplied. The power source IC 222 starts an operation when a voltage is applied to the VH terminal. Incidentally, in addition to the VH terminal, the power source IC 222 includes a Vcc terminal, a Gnd terminal, a FB terminal, an OUT terminal and an IS terminal.

A drain terminal of a field effect transistor (hereinafter, referred to as FET) 243 is connected to the other terminal of the primary winding 205a and its source terminal is connected to the DCL line via a current detecting resistor 241. A gate terminal of the FET 243 is connected to the OUT terminal of the power IC 222 via a gate resistor 242. When the power source IC 222 controls the FET 243 to be ON/OFF, a current flows through the primary winding 205a. The current which flows in the primary winding 205a is converted to a voltage by the current detecting resistor 241 and is input to the IS terminal of the power source IC 222. The power source IC 222 monitors the voltage of the IS terminal. In a case that the current which flows through the primary winding 205a and the FET 243 is equal to a predetermined value or higher, the power source IC 222 prevents overcurrent, when a short circuit in the primary side or a short circuit in a voltage output portion of the secondary side is occurred, by turning off the FET 243 via the OUT terminal. An overcurrent detecting circuit which is configured of the current detecting resistor 241 and the power source IC 222 is possible to protect from an overcurrent in a small space and in a cost effective way. In this way, the power source unit 120 according to the first embodiment includes the overcurrent detecting circuit on the primary side.

When the current flows in the primary winding 205a, a flyback voltage is induced in an auxiliary winding 205b and a secondary winding 205c so that polarity is reversed. The voltage which is induced in the auxiliary winding 205b is rectified and smoothed via a resistor 233, a diode 234 and a capacitor 235, and is output as a voltage Vcc. The voltage Vcc which is generated by the auxiliary winding 205b is supplied to the Vcc terminal in used as a power source for the power IC 222. Further, the voltage which is induced by the secondary winding 205c is rectified by a rectifier diode 251 on the secondary side, after that, is smoothed by a smoothing capacitor 252 on the secondary side and is output as a DC voltage Vo2.

(Feedback Circuit)

Next, a feedback circuit 224 will be described below. The feedback circuit 224 includes a resistor 253, a resistor 254, a resistor 255, a resistor 256, a resistor 257, a shunt regulator 258, an FET 259, a photocoupler 206, a capacitor 207, etc. The feedback circuit 224 monitors the DC voltage Vo2 and feeds it back as an FB signal from a circuit of the secondary side to the FB terminal of the power source IC 222 of the primary side via the photocoupler 206 so that the DC voltage Vo2 becomes 10V or 24V. The power source IC 222 controls the FET 243 to be ON/OFF so that the DC voltage Vo2 becomes a predetermined voltage based on a voltage which is input to the FB terminal.

Further, 10V/24V signal is input to the feedback circuit 224 from the engine controller 123. Specifically, the CPU 223 of the engine controller 123 outputs the 10V/24V signal from a Port 203 to a gate terminal of the FET 259 of the feedback circuit 224 via a resistor 264. The feedback circuit 224 switches a circuit so that the DC voltage Vo2 becomes 10V or 24V depending on the 10V/24V signal.

For example, the feedback circuit 224 feeds back to the power source IC 222 so that the DC voltage Vo2 becomes 10V when the 10V/24V signal is high level. On the other hand, the feedback circuit 224 feeds back to the power source IC 222 so that the DC voltage Vo2 becomes 24V when the 10V/24V signal is low level. In this way, the CPU 223 is possible to switch between the first output mode in which the power source unit 120 is controlled so that the DC voltage Vo2 is 24V, and the second output mode in which the power source unit 120 is controlled so that the DC voltage Vo2 is 10V.

Between the DC voltage Vo2 and ground (hereinafter, referred to as Gnd)), the resistor 253, the resistor 254 and the resistor 256 are connected in series, and the FET 259 is connected to resistor 256 in parallel. That is, a drain terminal of the FET 259 is connected to a connection point of the resistor 254 and the resistor 256, and a source terminal of the FET 259 is connected to Gnd of the secondary side. Furthermore, the 10V/24V signal which is output from the engine controller 123 is input to a gate terminal of the FET 259, as described above.

In a photodiode 206*a* of the secondary side of the photocoupler 206, an anode terminal is connected to the DC voltage Vo2 via the resistor 255 and a cathode terminal is connected to a cathode terminal of the shunt regulator 258. Incidentally, the resistor 257 which is connected to the photodiode 206*a* of the photocoupler 206 in parallel is a resistor to bypass leakage current of the shunt regulator 258.

In the shunt regulator 258, an anode terminal is connected to the Gnd of the DC voltage Vo2 and, at the same time, a reference terminal is connected to a connection point of the resistor 253 and the resistor 254. In a phototransistor 206*b* of the primary side of the photocoupler 206, a collector terminal is connected to the FB terminal of the power source IC 222 as the FB signal and an emitter terminal is connected to the DCL line. The capacitor 207 is a capacitor for noise absorption which is provided for the FB signal and is connected between the FB terminal of the power source IC 222 and the DCL line.

(Switching of the DC Voltage Vo2)

In the following, a method how the feedback circuit 224 switches the DC voltage Vo2 to 24V or 10V will be described. When the 10V/24V signal which is output from the engine controller 123 is high level, the FET 259 is turned on (ON). At this time, voltage which is divided by the DC voltage Vo2 with the resistor 253 and the resistor 254 is input to a reference terminal of the shunt regulator 258. Then, the reference terminal of the shunt regulator 258 is fed back to the FB terminal of the power source IC 222 via the photocoupler 206 so that the reference terminal of the shunt regulator 258 is the same as an internal reference voltage, and as a result, the DC voltage Vo2 is controlled at 10V.

Further, when the 10V/24V signal is low level, the FET 259 is turned off (OFF). At this time, voltage which is divided by the DC voltage Vo2 with the resistor 253 and a combined resistance of the resistor 254 and the resistor 256 is input to the shunt regulator 258. Then, the reference terminal of the shunt regulator 258 is fed back to the FB terminal of the power source IC 222 via the photocoupler 206 so that the reference terminal of the shunt regulator 258 is the same as the internal reference voltage, and as a result, the DC voltage Vo2 is controlled at 24V.

(Engine Controller)

The engine controller 123 includes the CPU 223 and the DC-DC converter 121. The DC voltage Vo2 which is output from the power source unit 120 is connected from the engine controller 123 to the driving unit and the high voltage power source (both not shown), etc. which are described above, together with a control signal (not shown) which is output from the CPU 223. Incidentally, a switch, etc. may be provided to shut off the supply of the DC voltage Vo2 during the sleep mode, in order to prevent the DC voltage Vo2 from being supplied wastefully to the driving unit, etc. in the sleep mode and the power off mode.

The 10V/24V signal is output from the engine controller 123 to the power source unit 120. The 10V/24V signal is output from the terminal of the Port 203 of the CPU 223 via the resistor 264, and the high level/low level is input to the power source unit 120. The CPU 223 switches the DC voltage Vo2 to 10V or 24V by switching the terminal of the Port 203 high level/low level.

The CPU 223 includes an A/D converter which performs analog-digital conversion when a detection result of the thermistor 208 is input. The A/D converter operates in the print mode and the standby mode, and stops operating in the sleep mode and the power off mode. The A/D converter converts the voltage input from the A/D terminal 201. The CPU 223 includes an external trigger port 250, which is a port capable of detecting a signal which is output from a recovery circuit 127 in the sleep mode and power off mode. Further, the CPU 223 also includes the Port 202 and the Port 203.

(Dc-Dc Converter)

The DC voltage Vo2 which is output from the power source unit 120 is input to the engine controller 123. The DC voltage Vo2 is also input to a DC-DC converter 121, and the DC voltage Vo2 is converted and outputs a DC voltage Vo. The DC-DC converter 121 operates to output 3.3V as the DC voltage Vo whether the input DC voltage Vo2 is 24V or 10V. The DC voltage Vo is supplied to a control circuit inside the engine controller 123 (not shown) and a circuit of a control system which includes the video controller 131, a laser emitting portion of the laser scanner 106 (not shown), the top sensor 143, etc., as described above.

(Thermistor)

The thermistor 208 (temperature detecting means) which is a temperature detecting element is arranged in the power source unit 120 and is arranged near the transformer 205 (in this case, the secondary winding 205*c* of the transformer 205) and the rectifier diode 251, which are elements which generate heat due to increased load current. That is, the thermistor 208 is arranged on the secondary side of the power source unit 120 in order to detect the temperature of the power source unit 120. In the thermistor 208, one terminal is input to the Gnd of the secondary side and the other terminal is input to the A/D terminal 201 which is an A/D port of the CPU 223 on the engine controller 123 via the resistor 211, as a thermistor signal (hereinafter referred to as a TH signal). The TH signal is pulled up by a pull up resistor 209 on the engine controller 123. The TH signal is connected to the recovery circuit 127, and the output of the recovery circuit 127 by the thermistor 208 is input to the external trigger port 250 of the CPU 223. For more details, the recovery circuit 127 by using the thermistor 208 will be described below in FIG. 5.

Incidentally, the CPU 223 includes a plurality of other ports. Among the plurality of ports in which the CPU 223 includes, a port which requires periodic monitoring of a signal which is input to the port (for example, a signal from a sensor, etc.) even when the main assembly 101 is in the sleep mode is defined as IO Port A. Further, among the plurality of ports in which the CPU 223 includes, a port which does not operate when the main assembly 101 is in the sleep mode and the power off mode even when a signal is input to the port is defined as an IO Port B. Here, the A/D terminal 201 and the external trigger port 250 will be described below as a port which is independent of the IO Port A and the IO Port B.

(Driving Circuit of Cooling Fan)

A driving circuit 126 is a circuit which drives the cooling fan 125 for cooling the power source unit 120. The driving circuit 126 supplies voltage to the cooling fan 125 by a signal which is output from the Port 202 of the CPU 223. Incidentally, the Port 202, which is connected to the driving circuit 126 for driving the cooling fan 125, is included in the IO Port B which is described above. In a case that the signal which is output from the Port 202 is a high level signal (hereinafter, referred to as a Hi signal), the driving circuit 126 outputs 24V and the cooling fan 125 rotates at full speed. In a case that the signal which is output from the Port 202 is a PWM signal, the driving circuit 126 outputs voltage according to the PWM signal, and the cooling fan 125 rotates at a lower speed according to the voltage.

The CPU 223 controls the cooling fan 125 based on the detection result of the thermistor 208. Specifically, the CPU 223 monitors the TH signal when the main assembly 101 is in the standby mode or the print mode (10V/24V signal is in a condition at low level) and determines whether the temperature which is detected by the thermistor 208 is within a normal range. In a case that the detected temperature is equal to a predetermined temperature or lower, the CPU 223 determines that the transformer 205 and the rectifier diode 251 of the secondary side are in a condition of a normal operation and determines that a load current of the power source unit 120 is within normal value. On the other hand, in a case that the detected temperature is higher than a predetermined temperature, the CPU 223 determines that the load current of the power source unit 120 is in a condition of extremely high and determines that temperature of the transformer 205 and the rectifier diode 251 is risen to extremely high. And the CPU 223 controls the cooling fan 125 to rotate at full speed even in a condition that the cooling fan 125 is stopped or rotating at low speed. In this way, the power source unit 120 is cooled down, and it is possible to secure failure prevention and safety of the transformer 205 and the rectifier diode 251.

[Overcurrent Detection]

Figure 3:
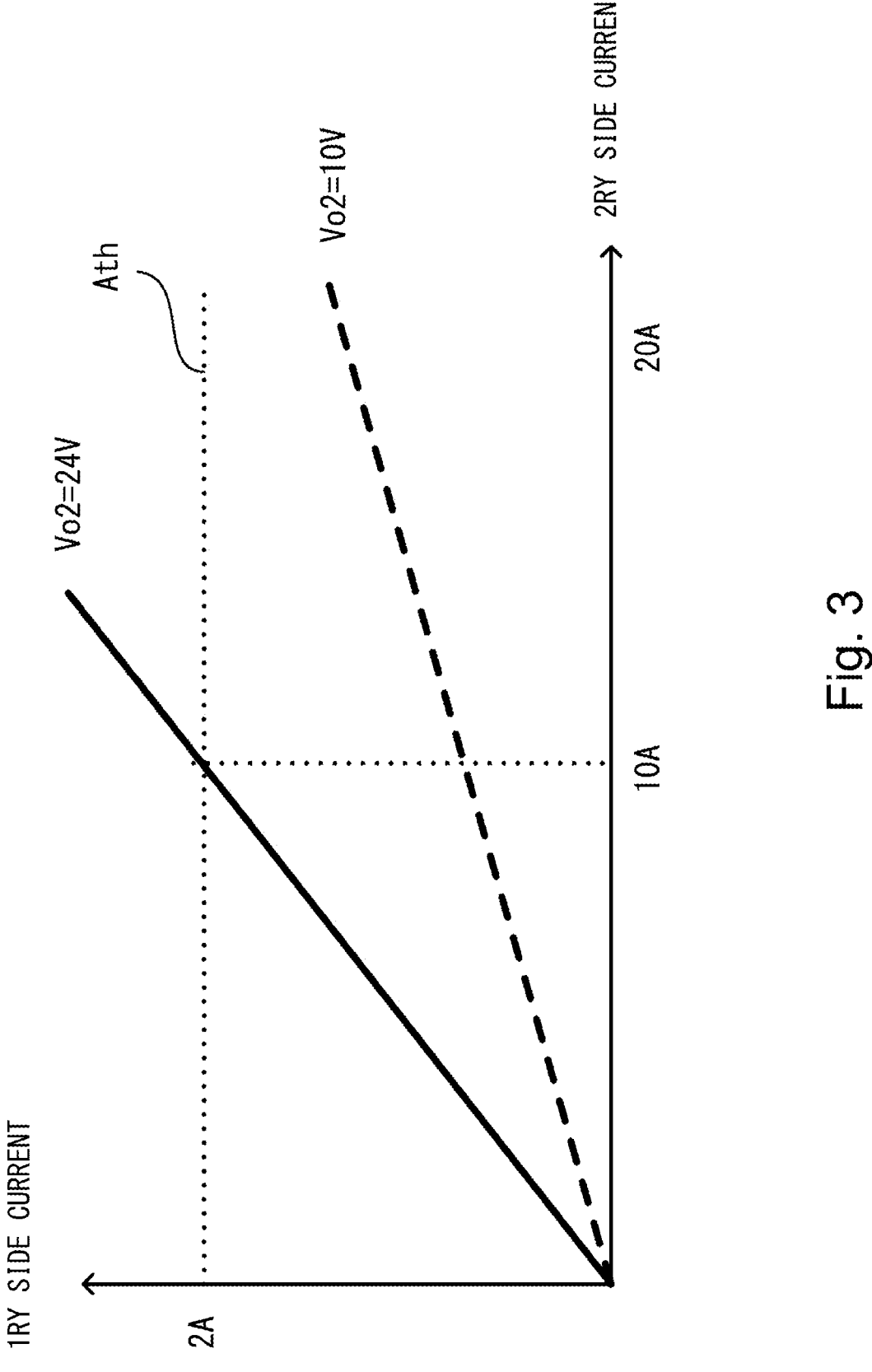
FIG. 3 is a graph showing a relationship between a current of a secondary side and a current of a primary side according to the first embodiment.

Next, an overcurrent detection in the primary side when the DC voltage Vo2 is 24V and 10V will be described by using FIG. 3. FIG. 3 is a graph that a current of the secondary side (hereinafter, referred to as a secondary side current) when value of the secondary side current is increased is shown on the horizontal axis, and a current of the primary side (hereinafter, referred to as a primary side current) which flows through the current detecting resistor 241 at that time is shown on the vertical axis. In FIG. 3, value in a case that the DC voltage Vo2 is 24V is shown in the solid line, and value in a case that the DC voltage Vo2 is 10V is shown in the dashed line. Further, an overcurrent detection threshold as a threshold value Ath for determining that it is an overcurrent in the primary side is shown in the dotted line. In the first embodiment, for example, the threshold value Ath is set to be 2 A, however, it is not limited to this value. The threshold value Ath is set by considering disparity of AC voltage of the AC power source 200 which is an input voltage, etc., with respect to the secondary side current during normal use.

(In a Case that the DC Voltage Vo2 is 24V)

The primary side current when the secondary side current is increased in the case that the DC voltage Vo2 is 24V will be described. As the secondary side current increases, the primary side current reaches the threshold Ath when the secondary side current reaches 10 A. In this way, in the case that the DC voltage Vo2 is 24V, since the primary side current is equal to the threshold Ath or higher when the secondary side current is 10 A, it is possible to detect an overcurrent by the overcurrent detecting circuit.

(In a Case that the DC Voltage Vo2 is 10V)

Next, the primary side current when the secondary side current is increased in the case that the DC voltage Vo2 is 10V will be described. In the case that the DC voltage Vo2 is 10V, an increased amount of the primary side current when the secondary side current is increased is smaller than the case that the DC voltage Vo2 is 24V. Therefore, even when the secondary side current is increased to 20 A, the primary current value does not reach the threshold value Ath. This is because the value of the primary side current is determined by power which is used in the secondary side, and in the case that the DC voltage Vo2 is low, the power which is used in the secondary side is low and the value of the primary side current is low. In this way, in the case that the DC voltage Vo2 is 10V, it is not possible to detect an overcurrent by the overcurrent detecting circuit of the primary side even when the secondary side current exceeds 10 A.

[Mode of Printer, Mode of Power Source, and Condition of Each Port of CPU] (at (At a Time when the Printer is in the Print Mode and the Standby Mode)

Next, each mode of the main assembly 101 and the mode of the power source, the condition of the CPU 223 and the condition of each port of the CPU 223 at that time will be described by using FIG. 4. First of all, when the main assembly 101 is in the print mode and the standby mode, the mode of the power source is in the first output mode and the power source outputs 24V as the DC voltage Vo2. The mode of the CPU 223 (hereinafter, referred to as a CPU mode) is a condition in which all modules are possible to operate and detect, and the IO port A, the IO port B, the A/D terminal 201, and the external trigger port 250 are all valid. This is described as "FULL" in FIG. 4.

(At a Time when the Printer is in the Sleep Mode and the Power Off Mode)

When the main assembly 101 is in sleep mode and power off mode, the mode of the power source is the second output mode and the power source outputs 10V from the DC voltage Vo2. The mode of the CPU 223 is low power mode, and low power is achieved by turning off the power source for the modules inside the CPU 223 and by slowing down the operation of the CPU 223.

When the main assembly 101 is in the power off mode, it is often set to be a condition of lower power than in the sleep mode. In this case, the IO port A, operations of the IO port B and the A/D terminal 201 of the CPU 223 are stopped (invalid). Incidentally, only the external trigger port 250 is operated (valid) in the CPU 223 so to detect only that the recovery circuit 127 by the thermistor 208 or a power source switch (not shown) is pressed. In this way, further lower power is achieved at a time of the power off of the main assembly 101.

In the sleep mode of the main assembly 101, the IO port A is operated intermittently compared to the time of the power off. In this way, the CPU 223 periodically detects a sensor which is needed to be detected (for example, a door sensor, etc.) even when the main assembly 101 is in the sleep mode, and it is possible to return from the sleep mode to the standby mode in such a case that a door, etc. is opened by a user.

In the sleep mode and the power off mode, the CPU 223 is in the low power mode and it is not possible to operate the cooling fan 125 for cooling the power source because each port is in a condition of functional restriction. Further, since the operation of the A/D converter is also stopped, it is not possible to detect temperature of the thermistor 208 by the A/D terminal 201 which is the A/D port. And the power source mode is the second output mode which outputs 10V in the sleep mode and the power off mode. Therefore, it may be difficult to protect by the overcurrent detecting circuit of the primary side, in terms of destruction prevention and ensuring safety from overcurrent of the secondary winding 205c of the transformer 205 and the rectifier diode 251.

FIG. 4 summarizes the mode of the main assembly 101, the power source mode, and the condition of each port of the CPU 223. The corresponding power source mode (24V, 10V) for each of the print, the standby, the sleep and the power off is indicated. Further, the CPU mode for each of the print, the standby, the sleep and the power off of the main assembly 101 is indicated. Here, there are conditions of FULL, low power and lower power than sleep for the CPU mode. And conditions of the IO port A, the IO port B, the A/D converter (in other words, the A/D terminal 201) and the external trigger port 250 are indicated corresponding to the CPU mode. Incidentally, for the condition of each port, "○" indicates that it is operating, "×" indicates that it is not operating, and "Δ" indicates that it is operating intermittently.

When FIG. 4 is seen in the mode of the main assembly 101, that is, FIG. 4 is seen in a vertical direction, it is found that the DC voltage Vo2 of the power source mode is 24V in the first output mode and the CPU mode is FULL at a time of the print mode, for example. At this time, each port of the CPU 223 is all "○" and all ports are operating. Further, for example, when the power source is off, it is found that the DC voltage Vo2 of the power source mode is 10V in the second output mode, and the CPU mode is lower power than sleep at a time of power off. At this time, each port of the CPU 223 operates only the external trigger port 250, and the other ports are invalid. Further, when FIG. 4 is seen in some port of the CPU 223, that is, FIG. 4 is seen in a horizontal direction, it is found that the IO port A, for example, operates in the print mode and the standby mode, does not operate in the power off mode and operates intermittently at a time of sleep. Further, it is found that the external trigger port 250, for example, operates in such a way that it is always capable of detecting in all modes of the main assembly 101.

In this way, in the sleep mode and the power off mode, it is not possible to operate the cooling fan 125, it is not possible to detect temperature via the A/D terminal 201 due to the operational restriction, and the protection by the overcurrent detecting circuit of the primary side does not work. Even in such a case, a configuration and a method, which are possible to perform destruction prevention and ensuring safety from overcurrent of the secondary winding 205c of the transformer 205 and the rectifier diode 251 in the first embodiment, will be described.

[Recovery Circuit]

A detailed circuit of the recovery circuit 127 by the thermistor 208 will be described by using FIG. 5. The recovery circuit 127 which is a signal output circuit outputs a signal to the CPU 223 when temperature which is detected by the thermistor 208 becomes equal to a predetermined temperature or higher. The recovery circuit 127 includes a resistor 212, a resistor 213, a pullup resistor 215 and an FET 214 which is a switch element.

(In a Case of the Print Mode and the Standby Mode)

In a case of the print mode and the standby mode, the power source mode is the first output mode and the DC voltage Vo2 outputs 24V. At that time, the A/D terminal 201 of the CPU 223 is in the condition that it is possible to operate as described in FIG. 4. Therefore, voltage in which the DC voltage Vo is divided by a combined resistance of the thermistor 208, the resistor 212 and the resistor 213 and the pullup resistor 209 is input to the A/D terminal 201 as the TH signal. As the temperature of the thermistor 208 increases, resistance value of the thermistor 208 decreases and the voltage which is input to the A/D terminal 201 decreases. The CPU 223 is able to detect the temperature of the thermistor 208 via the A/D terminal 201 by varying the resistance value of the thermistor 208.

(In a Case of the Sleep Mode and the Power Off Mode)

Next, a case of the sleep mode and the power off mode will be described. In the case of the sleep mode and the power off mode, the power source mode is the second output mode, and the DC voltage Vo2 outputs 10V. Further, since the mode of the CPU 223 is in the low power mode, the A/D converter is stopped, so it is not possible to detect the temperature of the thermistor 208 via the A/D terminal 201.

Figure 5:
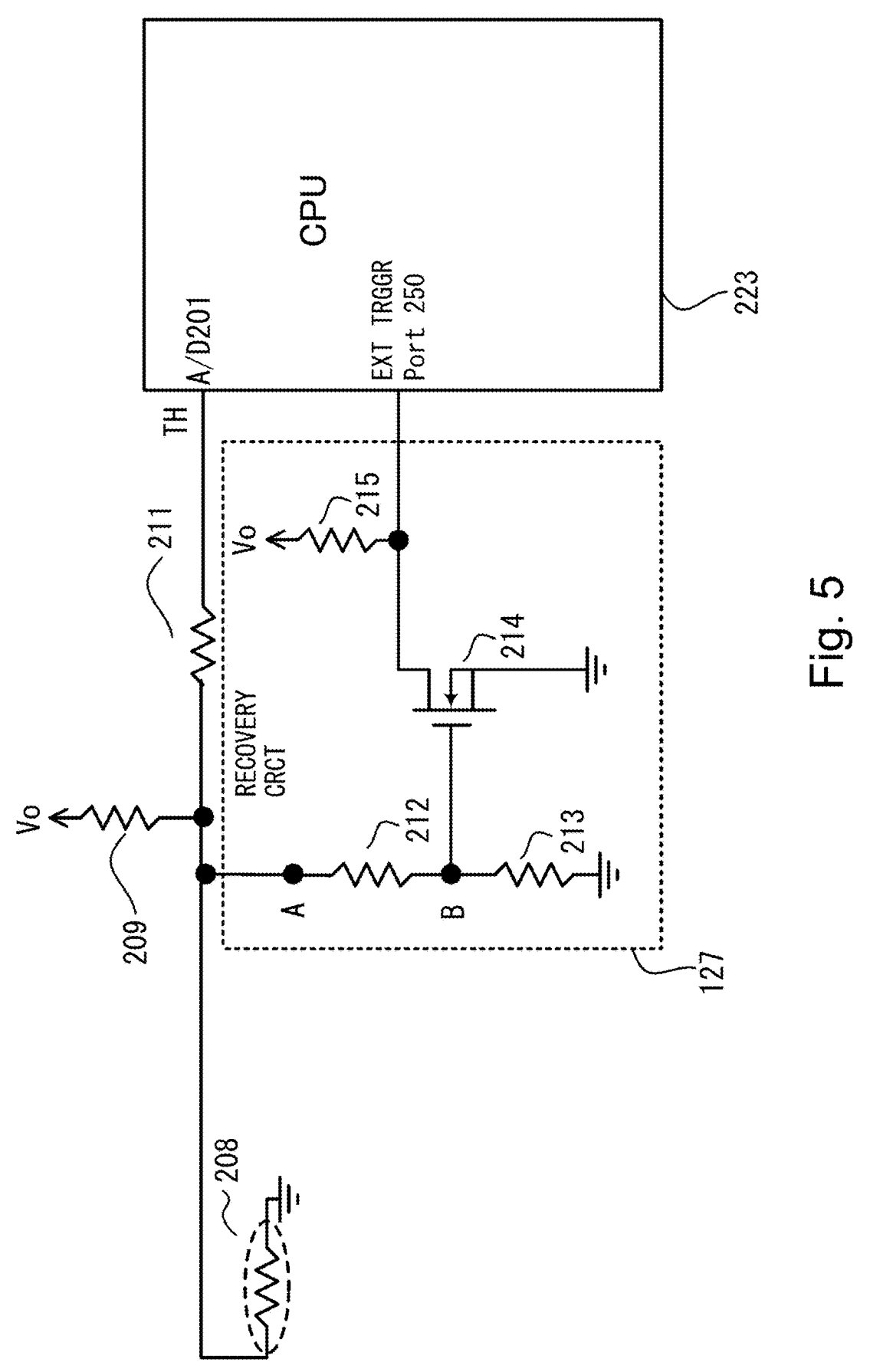
FIG. 5 is a diagram showing a recovery circuit by a thermistor according to the first embodiment.

Here, in the recovery circuit 127, the voltage in which the DC voltage Vo is divided by the combined resistance of the thermistor 208, the resistor 212 and the resistor 213 and the pullup resistor 209 is voltage at a point A which is indicated in FIG. 5. Furthermore, voltage in which the voltage at the point A is divided by the resistor 212 and the resistor 213 becomes voltage at a point B, and the voltage at the point B is input to a gate terminal of the FET 214. In a case that the voltage at the point B is lower than threshold voltage Vth in which the FET 214 transitions from non-conduction to conduction, the FET 214 is turned off and voltage which is input to the external trigger port 250 of the CPU 223 becomes high level by the pullup resistor 215. On the other hand, in a case that the voltage at the point B is higher than the threshold voltage Vth of the FET 214, the FET 214 is turned on and the voltage which is input to the external trigger port 250 of the CPU 223 becomes low level.

In a case that the temperature of the transformer 205 or the rectifier diode 251 is risen to extremely high, the temperature of the thermistor 208 becomes high and the resistance of the thermistor 208 becomes low. And the voltage at the point B gradually decreases, and the voltage which is input to the external trigger port 250 of the CPU 223 switches from low level to high level at a timing when the voltage at the point B becomes below the threshold voltage Vth of the FET 214. By switching the voltage which is input to the external trigger port 250 of the CPU 223 from low level to high level, the CPU 223 determines that the transformer 205 or the rectifier diode 251 is in an abnormal condition. And the CPU 223 recovers the main assembly 101 from the power off or the sleep mode to the standby mode. When the CPU 223 recovers the main assembly 101 to the standby mode and detects that the temperature of the thermistor 208 is equal to a predetermined temperature or higher by the A/D terminal 201, the cooling fan 125 is turned on at full speed. In this way, the power source unit 120 is cooled down, and it is possible to secure failure prevention and safety of the transformer 205 and the rectifier diode 251.

It is necessary to determine constant numbers by considering both of the followings for resistance values of the resistor 212, the resistor 213 and the pullup resistor 209 of the recovery circuit 127. That is, it is necessary to determine the constant values by considering both a resolution at a time of detecting temperature of the A/D terminal 201 and a threshold temperature at a time of recovering to the standby mode by the thermistor 208 from the power off mode or the sleep mode. In the first embodiment, by applying an NTC thermistor whose resistance value decreases as temperature rises to the thermistor 208, the temperature detecting circuit and the recovery circuit 127 by the thermistor 208 are configured. However, it is not limited to the first embodiment, such as configuring the temperature detecting circuit and the recovery circuit by the thermistor 208 by using a PTC thermistor whose resistance value increases as the temperature rises.

[Overcurrent Detection by Using Recovery Circuit]

Figure 6:
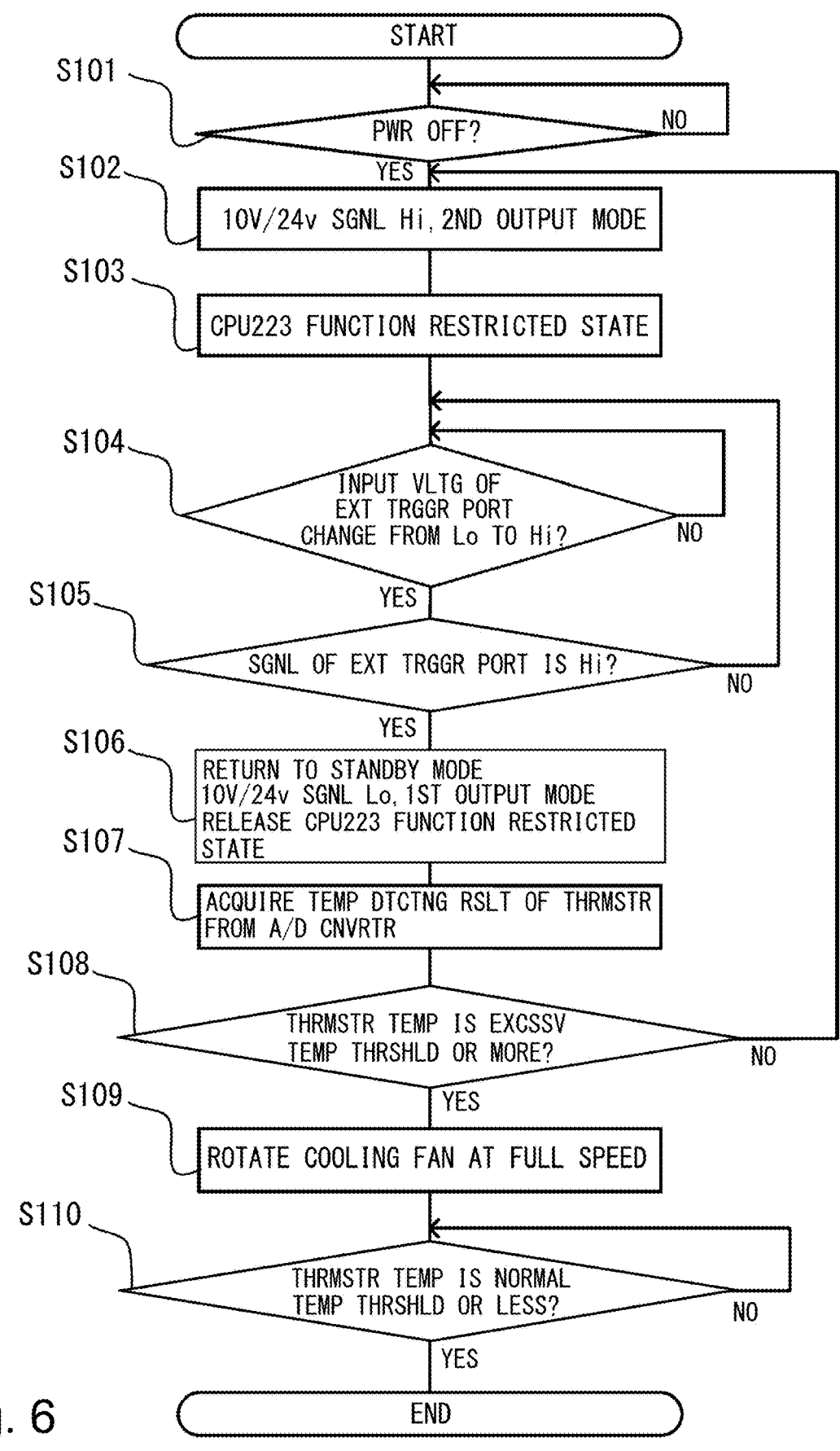
FIG. 6 is a flowchart showing a recovery control from a power source off mode to a standby mode according to the first embodiment.

A recovery process to the standby mode by the recovery circuit 127 according to the first embodiment will be described by using a flowchart in FIG. 6. In the first embodiment, an excessive temperature rise protection at the time of the power off mode will be described, however, since the operation is the same in the sleep mode as in the power off mode, the description will be omitted in the flowchart. When the CPU 223 detects that a signal is output from the recovery circuit 127 in the power off mode (or the sleep mode), it transitions from the sleep mode to the standby mode and controls the cooling fan 125 to operate and cool the power source unit 120. That is, when the CPU 223 detects that a signal is output from the recovery circuit 127 in the power off mode (or the sleep mode), it switches from the sleep mode to the standby mode and controls the cooling fan 125 to operate and cool the power source unit 120. When a sequence of the excessive temperature rise protection at the time of the power off mode starts, the CPU 223 executes a step (hereinafter, referred to as S) 101 and subsequent processes.

In the S101, the CPU 223 detects an operation of a power source switch (not shown) and determines whether a power off instruction is generated. In the S101, in a case that the CPU 223 determines that the power off instruction is not generated, a process is returned to the S101, and in a case that the CPU 223 determines that the power off instruction is generated, the process is proceeded to the S102. In the S102, the CPU 223 sets the 10V/24V signal to high level (Hi) and transitions the power source mode from the first output mode to the second output mode.

In the S103, the CPU 223 becomes in a condition of an internal functional restriction which is described in FIG. 4 in order to reduce energy consumption. Specifically, low power is achieved by turning off power sources of a part of the IO ports and the A/D converter and by slowing down the operation of the CPU 223. In the S104, the CPU 223 determines whether the input voltage of the external trigger port 250 is changed from the low level (Lo) to the high level (Hi) when the temperature of the thermistor 208 increases due to some abnormality such as an overcurrent. In the S104, the CPU 223 returns the process to the S104 in a case that the change is not detected, and the CPU 223 proceed the process to the S105 in a case that the change is detected.

In the S105, the CPU 223 determines whether a level (logic) of the input voltage (signal) of the external trigger port 250 is the high level or not. In the S105, the CPU 223 determines that the change in the S104 is a false detection and returns the process to the S104 in a case that it determines that the input voltage is the low level, and the CPU 223 proceeds to the S106 in a case that it determines that the input voltage is the high level. In the S106, the CPU 223 recovers the mode of the main assembly 101 to the standby mode. Specifically, the 10V/24V signal is set to be the low level, the power source mode is transitioned from the second output mode to the first output mode, and the functional restriction of the CPU 223 is released.

In the S107, the CPU 223 acquires the temperature detection result of the thermistor 208 from the A/D converter via the A/D terminal 201. In the S108, the CPU 223 determines whether the temperature of the thermistor 208 is equal to or higher than a first threshold value (excessive temperature rise threshold value) which is used to determine excessive temperature rise. In the S107, the CPU 223 returns the process to the S102 in a case that it determines that the temperature of the thermistor 208 is less than the first threshold value, and the CPU 223 proceeds the process to the S109 in a case that it determines that the temperature of the thermistor 208 is equal to the first threshold value or higher. In the S109, the CPU 223 rotates the cooling fan 125 at full speed. In the S110, the CPU 223 determines whether the temperature of the thermistor 208 is equal to or lower than a second threshold value (a normal temperature threshold value) which is used to determine that the temperature is normal due to cooling by the cooling fan 125. In the S110, the CPU 223 returns the process to the S110 in a case that it determines that the temperature of the thermistor 208 is higher than the second threshold value, and the CPU 223 terminates the sequence in a case that it determined that the temperature of the thermistor 208 is equal to the second threshold value or lower.

As described above, it is possible to perform as follows, even in a case that it is not possible to operate the cooling fan 125, it is not possible to detect the temperature by the A/D converter due to the functional restriction and the protection by the overcurrent detection of the primary side does not work while the DC voltage Vo2 is as low as 10V. That is, the main assembly 101 is recovered to the standby mode by the recovery circuit 127 with the thermistor 208, and the power source unit 120 is cooled by the cooling fan 125. Therefore, it is possible to keep failure prevention and safety of the transformer 205 and the rectifier diode 251.

In this way, the power source unit 120 is configured with only one system of the AC-DC converter in the first embodiment. Further, the power source unit 120 is configured so that it is possible to secure failure prevention and safety of parts by overcurrent without providing the overcurrent prevention circuit of the secondary side for short circuit at a time of outputting medium voltage (from 6V to 12V) in a condition of the power off mode and the sleep mode.

As described above, according to the first embodiment, even a power source device which is provided with the one system of the AC-DC converter is able to protect the devices in the condition of the power off mode and the sleep mode without increasing cost and space.

Second Embodiment

In the first embodiment, the recovery circuit 127 with the thermistor 208 is configured of the resistor 212, the resistor 213, the resistor 215 and the FET 214. In the first embodiment, an example in which it is recovered to the standby mode by the operation of the recovery circuit 127 based on the TH signal of the thermistor 208 at the time of the excessive temperature rise in the power off mode and the sleep mode is described, and in the second embodiment, a recovery circuit which uses a comparator will be described.

Since the recovery circuit 127 which is described in the first embodiment is possible to be configured of the resistors and the FET, it is possible to establish the recovery circuit with the thermistor 208 in a small space. Since the recovery circuit 127 is configured to connect the resistor 212 and the resistor 213 in parallel to the thermistor 208, the CPU 223 detects the temperature of the thermistor 208 via the A/D terminal 201 for the divided voltage value with the pullup resistor 209. Therefore, it is necessary to set the constant numbers of the resistor 212 and the resistor 213 considering the resolution of the voltage in the CPU 223. Further, it is necessary to set the constant numbers of the resistor 212 and the resistor 213 so that the voltage at the point B when the temperature of the thermistor 208 becomes the temperature which recovers by the external trigger port 250 is equal to or lower than the threshold voltage Vth of the FET 214. Furthermore, it is necessary to set the constant numbers of the resistor 212 and the 213 so that the voltage at the point B when the temperature of the thermistor 208 is within the normal range is equal to and higher than the threshold voltage Vth of the FET 214.

[Recovery Circuit]

Figure 7:
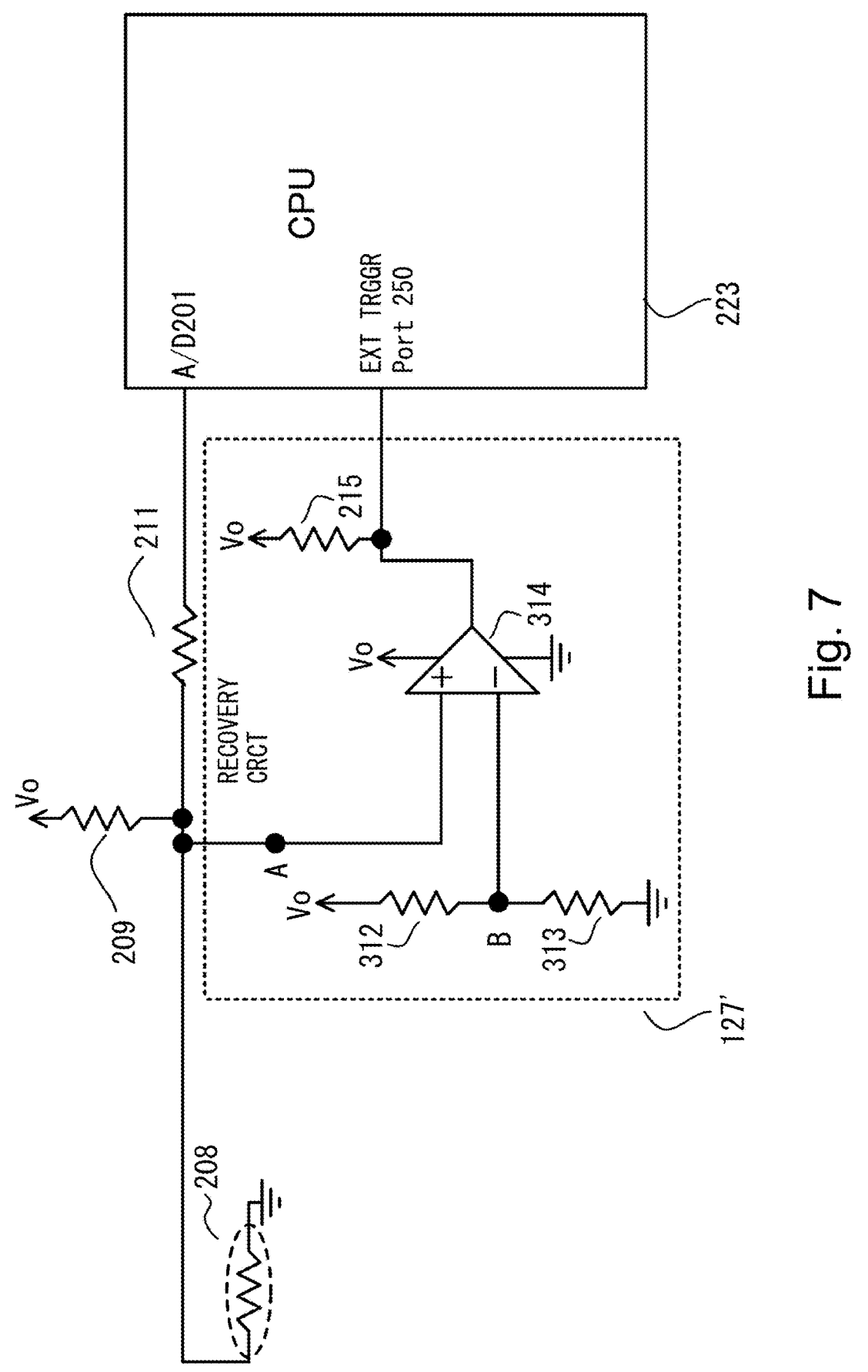
FIG. 7 is a diagram showing a recovery circuit by a thermistor according to a second embodiment of the present invention.

In the second embodiment, a configuration which has higher degree of design flexibility than compared to the recovery circuit 127 with the thermistor 208 according to the first embodiment will be described. In the second embodiment, a recovery circuit 127' with the thermistor 208 which uses a comparator will be described by using FIG. 7. Incidentally, the same configuration as in FIG. 5 is attached with the same reference numeral. The recovery circuit 127' with the thermistor 208 which is described in FIG. 7 includes the resistor 312, the resistor 313, the pullup resistor 215 and a comparator 314.

Voltage which is input to a-terminal (inverting input terminal) of the comparator 314 (voltage at the point B) is value in which the DC voltage Vo is divided by the resistor 312 and the resistor 313 (hereinafter, referred to as divided voltage value). The voltage at the point B is set to voltage corresponding to the temperature of the thermistor 208 to be recovered by a signal which is input to the external trigger port 250 of the CPU 223 (hereinafter, referred to as an external trigger signal). The voltage at the point A is divided voltage value by the DC voltage Vo and the thermistor 208, and is input to a + terminal (noninverting input terminal) of the comparator 314. The voltage at the point A is also input to the A/D terminal 201 of the CPU 223 via the resistor 211.

When the temperature of the thermistor 208 is increased, and the voltage at the point A is decreased and becomes lower than the voltage of the point B, the voltage which is output from the output terminal of the comparator 314 and is input to the external trigger port 250 of the CPU 223 switches from the high level to the low level. When the voltage which is input to the external trigger port 250 of the CPU 223 switches from the high to the low level, the CPU 223 determines that the transformer 205 or the rectifier diode 251 is in an abnormal state. And the CPU 223 recovers the main assembly 101 from the power off mode or the sleep mode to the standby mode.

When the CPU 223 recovers the main assembly 101 to the standby mode and detects by the A/D terminal 201 that the temperature of the thermistor 208 is equal to a predetermined temperature or higher, it cools the power source unit 120 by rotating the cooling fan 125 at full speed. Therefore, it is possible to secure failure prevention and safety of the transformer 205 and the rectifier diode 251. Incidentally, in the second embodiment, the process is similar to the flowchart in FIG. 6. However, in a determination process of the S104, it is determined whether or not it is changed from Hi to Lo. Furthermore, in a determination process of the S105, it is determined whether or not it is Lo.

In a case of the configuration according to the second embodiment, it is possible to independently determine the temperature of the thermistor 208 to recover to the standby mode by the external trigger port 250, by the voltage which is input to the—terminal of the comparator, regardless of the voltage which is input to the A/D terminal 201. As described above, since it is possible to design the recovery circuit 127 without considering the resolution of the temperature detection of the thermistor 208 at the A/D terminal 201, it is further possible to secure failure prevention and safety of the transformer 205 and the rectifier diode 251.

As described above, even in a case that the power source device which is provided with one system of the AC-DC converter is used, it is possible to protect the device in the condition of the power off mode and the sleep mode without increasing cost or space.

The disclosure of the present embodiments includes the following constitution examples.

(Constitution 1)

An image forming apparatus operable in a first mode and in a second mode comprising:

a power source device configured to convert an AC voltage of a primary side to a DC voltage and supply to a load of a secondary side, the power source device being operable in a first output mode for outputting a first voltage which is a DC voltage and in a second output mode for outputting a second voltage lower than the first voltage, and in the first outputting mode of the power source device the image forming apparatus operating in the first mode and in the second outputting mode the image forming apparatus operating in the second mode;

a cooling means configured to cool the power source device;

a temperature detecting means disposed in the secondary side of the power source device and configured to detect a temperature of the power source device;

a control means configured to control the cooling means based on a detecting result of the temperature detecting means, the control means being capable of switching the power source device between in the first output mode and in the second output mode; and a signal output circuit configured to output a signal to the control means when the temperature detected by the temperature detecting means is equal to a predetermined temperature or higher, wherein the control means includes a port capable of detecting the signal outputted from the signal output circuit in the second mode, wherein the cooling means operable in the first voltage, and wherein upon detecting that the signal is inputted to the port from the signal output circuit in the second mode the control means controls to switch the power source device from in the second output mode to in the first output mode and controls to operate the cooling means to cool the power source device.

(Constitution 2)

An image forming apparatus according to Constitution 1, wherein the control means is an A/D converter configured to perform an analog/digital conversion by inputting the detecting result of the temperature detecting means, the A/D converter operating in the first mode and stopping an operation in the second mode, and wherein the control means controls to the cooling means in the first mode based on the detecting result of the temperature detecting means converted by the A/D converter.

(Constitution 3)

An image forming apparatus according to Constitution 1, wherein the temperature detecting means is a thermistor, and wherein the signal output circuit includes at least two resistors connected to the thermistor in parallel and a switch element.

(Constitution 4)

An image forming apparatus according to Constitution 1, wherein the temperature detecting means is a thermistor, and wherein the signal output circuit includes a comparator and at least two resistors.

(Constitution 5)

An image forming apparatus according to Constitution 1, wherein the first mode includes a print mode which is a state for capable of performing an image forming operation to a recording material and a stand-by mode for capable of shifting to the print mode by receiving a print command.

(Constitution 6)

An image forming apparatus according to claim 1, wherein the second mode includes a sleep mode and a power off mode in which the AC voltage is inputted and a power consumption is lower than that in the sleep mode.

(Constitution 7)

An image forming apparatus according to Constitution 1, wherein the power source device includes an overcurrent detecting circuit provided on the primary side and configured to detect that an overcurrent flows to the load.

(Constitution 8)

An image forming apparatus according to Constitution 1, wherein the power source device includes a transformer including a primary winding and a secondary winding, and a rectifying diode configured to rectify a voltage induced in the secondary winding, and wherein the temperature detecting means detects a temperature of the secondary winding of the transformer and the rectifying diode.

According to the present invention, even in the case that the power source device which is provided with one system of the AC-DC converter is used, it is possible to protect the device in the condition of the power off mode and the sleep mode without increasing cost or space.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-107145 filed on Jun. 29, 2023, which is hereby incorporated by reference herein in its entirety.

What is claimed is:

1. An image forming apparatus operable in a first mode and in a second mode, the image forming apparatus comprising:

a power source device configured to convert an AC voltage of a primary side to a DC voltage and supply to a load of a secondary side, the power source device being operable in (i) a first output mode in which the image forming apparatus is in the first mode and (ii) a second output mode in which the image forming apparatus is the second mode, wherein the power source is configured to output a first DC voltage in the first output mode and is configured to output a second DC voltage lower than the first DC voltage in the second output mode;

a cooling fan configured to cool the power source device;

a temperature detector disposed at the secondary side of the power source device and configured to detect a temperature of the power source device;

a processing unit configured to control the cooling fan based on a detecting result of the temperature detector, the processing unit being capable of switching the power source device between the first output mode and the second output mode; and a signal output circuit configured to output a signal to the processing unit when the temperature detected by the temperature detector is equal to a predetermined temperature or higher, wherein the processing unit includes a port capable of detecting the signal output from the signal output circuit in the second mode, wherein the cooling fan is operable at the first DC voltage, and wherein, in a case where the signal is inputted to the port from the signal output circuit in the second mode, the processing unit controls to switch the power source device from the second output mode to the first output mode and controls to operate the cooling fan to cool the power source device.

2. An image forming apparatus according to claim 1, wherein the processing unit includes an A/D converter configured to perform an analog/digital conversion by inputting the detecting result of the temperature detector, the A/D converter operating in the first mode and stopping an operation in the second mode, and wherein the processing unit controls the cooling fan in the first mode based on the detecting result of the temperature detector converted by the A/D converter.

3. An image forming apparatus according to claim 1, wherein the temperature detector is a thermistor, and wherein the signal output circuit includes at least two resistors connected to the thermistor in parallel and a switch element.

4. An image forming apparatus according to claim 1, wherein the temperature detector is a thermistor, and wherein the signal output circuit includes a comparator and at least two resistors.

5. An image forming apparatus according to claim 1, wherein the first mode includes a print mode that is a state for capable of performing an image forming operation to a recording material and a stand-by mode for capable of shifting to the print mode by receiving a print command.

6. An image forming apparatus according to claim 1, wherein the second mode includes a sleep mode and a power off mode in which the AC voltage is input and a power consumption is lower than that in the sleep mode.

7. An image forming apparatus according to claim 1, wherein the power source device includes an overcurrent detecting circuit provided on the primary side and configured to detect that an overcurrent flows to the load.

8. An image forming apparatus according to claim 1, wherein the power source device includes a transformer including a primary winding and a secondary winding, and a rectifying diode configured to rectify a voltage induced in the secondary winding, and wherein the temperature detector detects a temperature of the secondary winding of the transformer and the rectifying diode.

9. The image forming apparatus according to claim 1, wherein operation of the cooling fan is restricted in a state where the power source device is in the second output mode.

10. The image forming apparatus according to claim 1, wherein, when the port is defined as a first port, the processing unit further includes at least one second port, wherein, when the power source device is in the first output mode, the processing unit is in a processing mode in which the first port and the at least one second port are valid, and wherein, when the power source device is in the second output mode, the processing unit is in a low power mode in which the first port is valid and the at least one second port is invalid.

11. The image forming apparatus according to claim 1, wherein the port is an external trigger port, wherein the signal output circuit is configured so that input voltage which is input to the external trigger port switches from one of low level and high level to the other of the low level and the high level when the temperature detected by the temperature detector is equal to the predetermined temperature or higher, and wherein, in a case where the power source device is in the second output mode and the input voltage is switched from the one of the low level and the high level to the other of low level and the high level, the processing unit controls to switch the power source device from the second output mode to the first output mode.

* * * * *